United States Patent [19]
Naoi

[11] Patent Number: 5,822,949
[45] Date of Patent: Oct. 20, 1998

[54] PERFORMANCE CONTROLLER FOR MULTIPLE AUTOMATIC PACKING MACHINE

[75] Inventor: Mituo Naoi, Sagamihara, Japan

[73] Assignee: Sanko Machinery Co., Ltd., Kanagawa-ken, Japan

[21] Appl. No.: 755,165

[22] Filed: Nov. 22, 1996

[30] Foreign Application Priority Data

Apr. 3, 1996 [JP] Japan .................................... 8-106305

[51] Int. Cl.⁶ .............................. B65B 9/10; B65B 57/00; B65B 59/00
[52] U.S. Cl. .................................... 53/55; 53/64; 53/546; 53/551
[58] Field of Search ................................. 53/55, 52, 202, 53/546, 551, 552, 554, 555, 451, 66, 64

[56] References Cited

U.S. PATENT DOCUMENTS

| | | | |
|---|---|---|---|
| 2,918,769 | 12/1959 | Anderson et al. | 53/546 |
| 3,250,055 | 5/1966 | Schafer, Jr. | 53/546 |
| 4,955,176 | 9/1990 | Seko et al. | 53/55 X |
| 5,241,800 | 9/1993 | Steinke et al. | 53/55 |
| 5,408,807 | 4/1995 | Lane, Jr. et al. | 53/546 X |
| 5,634,324 | 6/1997 | Schmachtel | 53/546 |

*Primary Examiner*—James F. Coan
*Attorney, Agent, or Firm*—Stevens, Davis, Miller & Mosher, L.L.P.

[57] ABSTRACT

A multiple automatic packing machine packs a material by continuously and repeatedly slitting a wide sheet-like packing material into a predetermined number of packing films fed from a take-up roll, seal-molding each of the packing films into a bag-like configuration by a vertical sealer and a lateral sealer, filling the material to be packed into each of the packing films, withdrawing each of the packing films by lowering the lateral sealer a portion equal to the length of the bag to be formed, raising the lowered lateral sealer back to a location before the lateral sealing by laterally opening the lateral sealer, and cutting a center line portion of the lateral seal of each of the packing films. The machine includes a performance controller for the multiple automatic packing machine, the controller having a program input for setting the number of rotation of a motor for upwardly/downwardly driving the lateral sealer and the timings of operation of the filling device and a cutter driving device for each size of a product to be sealed, a key input for selecting a size number of the product to be sealed, and a control unit for controlling the number of rotations of the upwardly/downwardly driving motor and the timings of operation of the filling device and the cutter driving device, in accordance with a program for a size number selected by the key input.

4 Claims, 6 Drawing Sheets

(DATA MEMORY)

SIZE NO. 001

NUMBER OF ROTATION OF LATERAL SEALER UPWARD/DOWNWARD DRIVING MOTOR

NUMBER OF ROTATION OF FILLING DEVICE DRIVING MOTOR

NUMBER OF ROTATION OF CUTTER DRIVING MOTOR

NUMBER OF ROTATION OF PACKING MATERIAL FEED DRIVING MOTOR

SIZE NO. 002

NUMBER OF ROTATION OF LATERAL SEALER UPWARD/DOWNWARD DRIVING MOTOR

SIZE NO. n

NUMBER OF ROTATION OF LATERAL SEALER UPWARD/DOWNWARD DRIVING MOTOR

NUMBER OF ROTATION OF FILLING DEVICE DRIVING MOTOR

NUMBER OF ROTATION OF CUTTER DRIVING MOTOR

NUMBER OF ROTATION OF PACKING MATERIAL FEED DRIVING MOTOR

FIG. 6

PERFORMANCE CONTROLLER FOR MULTIPLE AUTOMATIC PACKING MACHINE

BACKGROUND OF THE INVENTION

1. Field of the Invention

This invention relates to a multiple automatic packing machine capable of automatically seal-molding a plurality of stick-like packing products at a time, and more particularly to a performance controller suited to be used for such a multiple automatic packing machine.

2. Brief Description of the Prior Art

A typical conventional automatic packing machine comprises the steps, as discussed for example in Japanese Utility Model Publication No. 54327/1983, for slitting a rolled-up packing material consisting of a wide sheet film which is uniformly printed, into a predetermined number of parts, vertically sealing the packing material, laterally sealing the packing material, filling a material to-be-packed (i.e., content material) into the packing material, and cutting the packing material all in a sequential manner.

This conventional multiple automatic packing machine will now be described in more detail with reference to FIG. 8. Reference character F denotes a take-up roll having a printed wide packing material FX taken up thereon; AS, AT, rollers for feeding the packing material, driven by a motor (not shown); BX..., slitters for slitting the packing material in to a plurality of packing films Fa... during the passage of the packing material between the slitters and a roller B; and Ca, Cb, guide rollers, respectively.

Similarly, reference character D... denotes supply tubes laterally arranged in parallel relation at equal spaces and adapted to fill the content material into the packing material; E... forming members for packing the supply tubes D... with the packing films Fa... coming from the feed rollers AS, AT; X, a vertical sealer for vertically sealing opposite end edges of the packing films Fa... so that the packing films Fa... will have a sleeve-like configuration as a whole; and Y, a lateral sealer for laterally sealing the vertically-sealed sleeve-like packing films Fa, respectively. With this construction, after the lateral sealing effected by the lateral sealer Y, the content materials are filled respectively into the packing films Fa... which were sealed respectively into bag-like configurations through the supply tubes D.... Then, each of the bag-like packing films Fa... laterally sealed by the lateral sealer Y is moved down one pack portion as they are, so that one pack portion can be pulled out from each of the packing films Fa...

Then, the lateral sealer Y is laterally opened to remove its laterally sealing state and raised in that state, returning to the position before the lateral sealing is preformed. In that position, the lateral sealing is performed again to tightly seal an opening of each sealed bag which contains therein the content material, and a cutter (not shown) vertically cuts a center line portion of the lateral seal. By this, one process of the multiple sealing operation is finished.

In FIG. 8, reference numeral P... denote packing products which are sealed into a stick-like configuration by the multiple automatic packing machine; Pa..., vertical sealed portions of them; and Pc and Pb, upper and lower lateral sealed-portions cut by the cutter, respectively.

As described above, according to the multiple automatic packing machine, it can offer such advantages that a large number of stick-like packing products can automatically be packed at a time. However, when the size (length) of the packing products is to be changed, the upward/downward moving quantity of the lateral sealer Y must be adjusted in accordance with the size.

In the conventional automatic packing machine, a rotary crank mechanism is used as means for upwardly and downwardly moving the lateral sealer Y. When the length of each bag is to be changed, the radius of rotation of this crank must be adjusted and in addition, the timing for filling the content material and the timing for cutting by the cutter must be adjusted each time using a rotary gear differential device, a timing setting cam, and the like. This is very troublesome because much time and labor is required.

Furthermore, it is required to repeat an adjustment operation by measuring the actual dimension using a measuring device or the like and weighing the actual weight using a gravimeter while repeating a test sealing operation for a while even after each adjusting operation is finished, in order to obtain a correct packing size and a correct filling quantity. Accordingly, there are such problems that the adjustment operation is complicated and takes more time. In addition, there is another problem that the test sealing for adjustment wastefully consumes much content material and packing material FX. Therefore, improvement is required.

The present invention has been accomplished in view of the above problems.

SUMMARY OF THE INVENTION

It is, therefore, an object of the present invention to provide a performance controller for a multiple packing machine in which a change of a bag size of a stick-like packing product automatically packed in a multiple manner and a change of the timing for filling a content material due to such a change can very easily be made by one-touch operation in accordance with a preset program.

To achieve the above object, there is essentially provided in a multiple automatic packing machine capable of continuously and repeatedly carrying out the steps of slitting a wide sheet-like packing material into a predetermined number of packing films fed from a take-up roll, seal-molding each of the packing films into a bag-like configuration by a vertical sealer and a lateral sealer, filling a material to-be-packed into each of the packing films which were seal-molded into a bag-like configuration, withdrawing each of the packing films by lowering the lateral sealer a portion equal to the length of the bag in a state that each of the packing films are laterally sealed, raising the lowered lateral sealer back to a location before carrying out the lateral sealing operation by laterally opening the lateral sealer, and cutting a center line portion of the lateral seal of each of the packing films, a performance controller for the multiple automatic packing machine comprising the program input means capable of setting the number of rotations of a motor for upwardly and downwardly driving the lateral sealer and the timings of operation of the filling device and a cutter driving device for each size of a product to be sealed, key input means for selecting a size number of the product to be sealed, and control means for controlling the number of rotations of the upwardly and downwardly driving motor and the timings of operation of the filling device and the cutter driving device, in accordance with a program for a size number selected by the key input means.

Owing to this feature, when the size number of the packing product to be sealed in a multiple manner is input through the keyboard, the program data, which are preset for each size, are accessed, the operation timing of the filling device (filling timing), the number of rotations of the lateral sealer upward/downward driving motor, and the operation timing of the cutter driving device are automatically adjusted in accordance with the program data. This makes it possible to continuously automatically pack, in a multiple manner, stick-like packing products containing a predetermined quantity of content material and having a predetermined size.

Furthermore, according to the above invention, it suffices that the size can be changed merely by changing the size number through the key input means. Accordingly, the changing operation can be performed very easily and accurately. This makes it possible to reduce the wasteful consumption of the packing material and the content material to the least possible level.

According to another aspect of the present invention, it is preferred that a guide shaft is vertically disposed within a machine body of the automatic packing machine, a lateral sealer frame having thereon a pair of lateral sealers and driving means for opening/closing the lateral sealers is upwardly and downwardly movably mounted on the guide shaft, and lateral sealer lift means comprising pulleys which can be rotated by an upwardly/downwardly driving motor, and a link member consisting of a timing belt, a chain, or the like and trained over the pulleys is mounted on the lateral sealer frame.

Owing to this feature, when the pulleys are rotated by the upward/downward driving motor in accordance with the preset program, the link member consisting of a timing belt, a chain or the like trained over the pulleys is moved to controllably move the lateral sealer frame upwardly and downwardly. Accordingly, the upper and lower length dimensions of the packing products to be sealed in a multiple manner can be seal molded to the length dimensions of the program by controlling the upward/downward quantity of movement of the lateral sealer which is loaded on the lateral sealer frame.

The above and other objects, characteristic features and advantages of the present invention will become more apparent to those skilled in the art by the following description of the preferred embodiment of the invention, as illustrated in the accompanying drawings.

BRIEF DESCRIPTION OF THE DRAWINGS

FIG. 6 is a view showing a construction of a part of a data memory which is stored in a memory unit;

DETAILED DESCRIPTION OF THE INVENTION

One preferred embodiment of a performance controller for a multiple automatic packing machine according to the present invention will now be described in detail with reference to the several sheets of the accompanying drawing. The preferred embodiment herein described is not intended to be exhaustive or to limit the invention to the precise form disclosed. It is chosen and described to explain the principles of the invention, its application and its practical use to enable others skilled in the art to utilize the invention.

Figure 1:
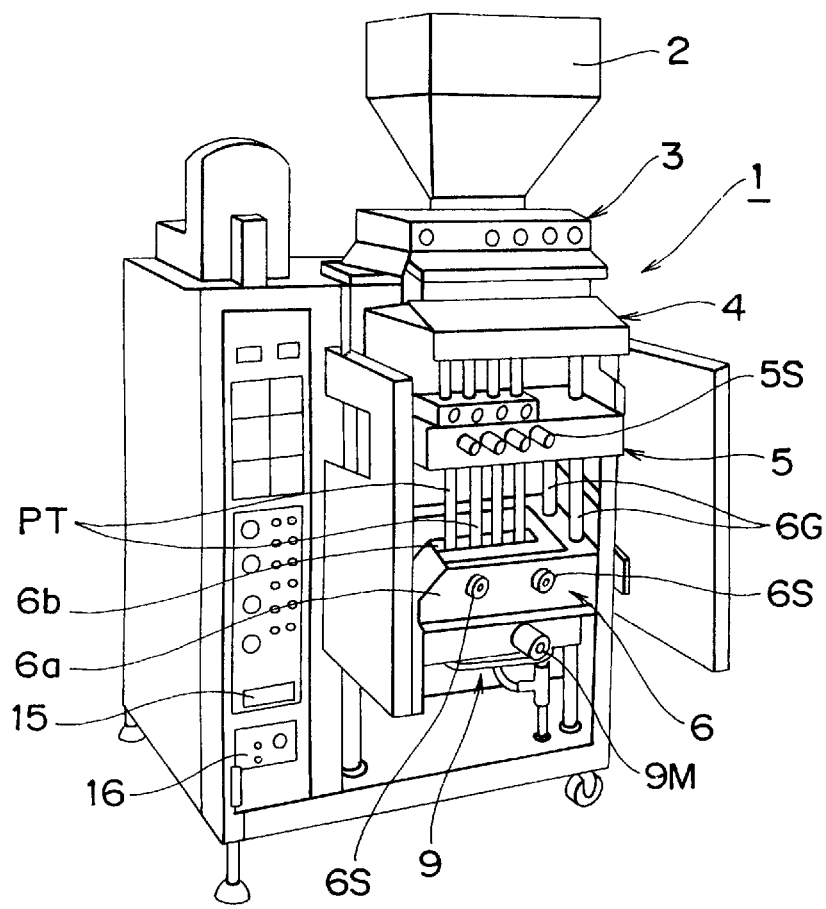
FIG. 1 is a perspective view showing one example of a multiple automatic packing machine which is equipped with a performance controller according to the present invention.
Figure 3:
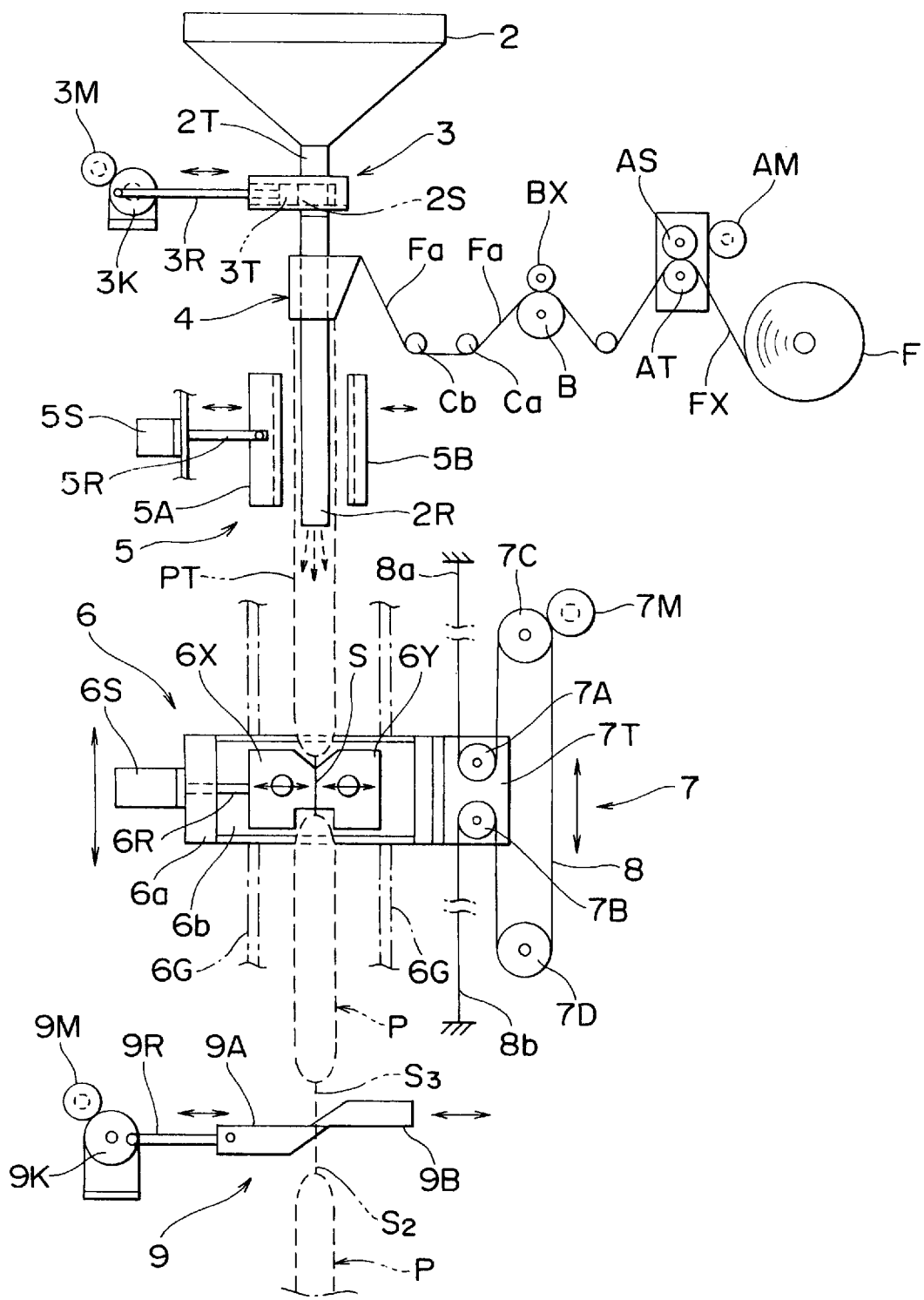
FIG. 3 is a schematic view showing a construction of the interior part of the multiple automatic packing machine which is equipped with the performance controller according to the present invention.

FIG. 1 is a perspective view showing an outer appearance of a multiple automatic packing machine which is equipped with a performance controller according to one embodiment of the present invention, and FIG. 3 is a schematic view showing a construction of an internal part of the multiple automatic packing machine of FIG. 1. In these Figures, reference numeral 1 generally denotes a machine body of the multiple automatic packing machine; 2, a hopper for receiving various kinds of material-to-be-packed (i.e., content materials) in the form of liquid, powder and viscous body, for example; 2T, a feed tube connected to the hopper 2; 3, a filling device for filling the content materials, mounted on an intermediate part 2S of the feed tube 2T; 3R, a piston shaft attached to a disk 3K which can be rotated by a driving motor 3M for filling the content materials; and 3T, a piston valve attached to a distal end of the piston shaft 3R, respectively. An air-cylinder may be used, where necessary, as means for driving the filling device 3 instead of the motor 3M.

Figure 8:
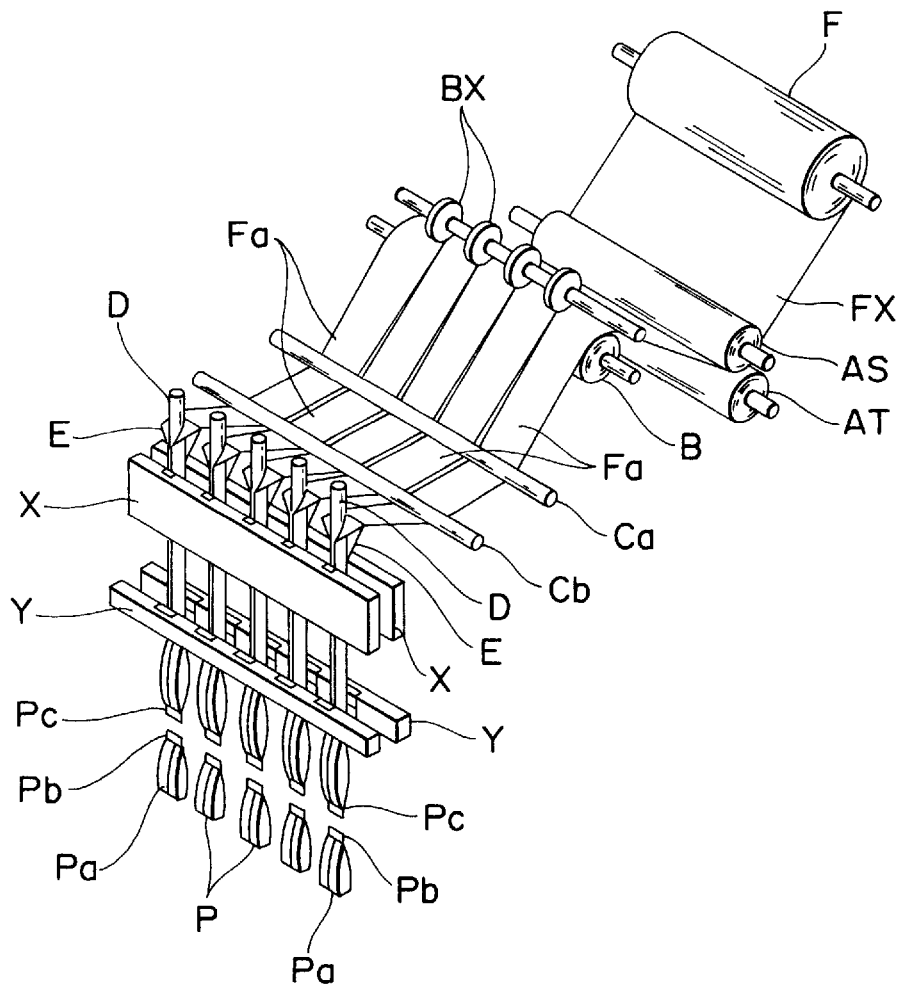
FIG. 8 is a perspective view for explaining a construction of a conventional multiple automatic packing machine.

In FIG. 3, only one feed tube 2T attached with the filling device 3 is shown. Actually, however, a plurality of feed tubes 2T having the same construction are attached to the hopper 2 at equal spaces, as in the prior art of FIG. 8, so that the content materials can be supplied to the respective feed tubes 2T.

Reference numeral 4 denotes a forming member for taking up the coming packing films Fa around the feed tubes 2T. This device is the same as the prior art of FIG. 8 in the respects that a wide printed packing material FX coming from a take-up roll F is fed by feed rollers AS, At which are drive rotated by a motor AM, the packing material FX thus fed is slit into a plurality of packing films Fa . . . during the passage of the packing material between slitters BX and the feed rollers AS, AT, and the packing films Fa . . . thus slit are taken up around the feed tubes 2T by the forming member 4.

Reference numeral 5 generally denotes a vertical sealer device for vertically sealing the overlapped inner and outer opposite end edges of the packing films Fa which are taken up around the feed tubes 2T. This vertical sealer device 5 comprises a vertical sealer 5A attached to a distal end of an arm 5R which is reciprocally moved by a vertical sealer driving cylinder 5S, and a receiving plate 5B. Owing to this construction, the coming packing film Fa can be seal-formed into a generally sleeve-like configuration.

It should be noted that in the following description, some terms indicative of particular directions, such as the terms "upward" and "downward" as referred to in connection with various component members and elements of the embodiment shown are used merely for purposes of description with reference to the drawings.

Figure 4:
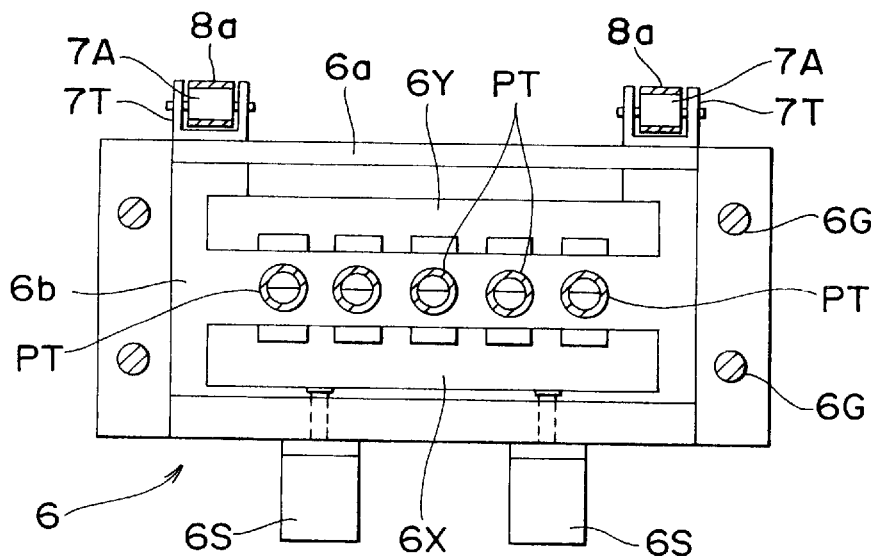
FIG. 4 is a planar sectional view of a lateral sealer device portion.

In FIGS. 1 and 3, as well as in the planar section of FIG. 4, reference numeral 6 generally denotes a lateral sealer device disposed at a lower part of the vertical sealer device 5. This lateral sealer device 6 comprises a lateral sealer frame 6a which is upwardly/downwardly movably mounted on guide shafts 6G, 6G which are vertically disposed within the machine body 1, a pair of lateral sealers 6X, 6Y assembled to the interior of the lateral sealer frame 6a such that the lateral sealers can perform a relative opening and closing operation, and an arm 6R which is reciprocally moved by the cylinder 6S so that the lateral seals 6X, 6Y are relatively opened and closed. The packing film Fa, which was vertically sealed to have a generally sleeve-like configuration by the vertical sealer device 5, is laterally sealed S so that its is seal-molded into an open top type bag member PT as a whole.

The filling device 3 is designed such that a predetermined quantity of the content material received in the hopper 2 is supplied into the bag member PT from its lower end port 2R through the feed tube 2T simultaneously when or immediately after the lateral sealing operation is carried out by the lateral sealer device 6. The lateral sealer device 6 is designed such that the filling operation of the content material made by the filling device 3 is completed, it is moved one pack portion downwardly by a lateral sealer lifting means to be described hereinafter while the bag member PT is held between the lateral sealers 6X and 6Y. Each packing film Fa is drawn one pack portion downwardly and thereafter, the lateral sealers 6X, 6Y are opened to release the bag member Pt. In that state, the lateral sealer device 6 is raised back to the position where it is located before the lateral sealing operation is carried out.

In FIG. 3, reference numeral 7 generally denotes a lateral sealer lift means. This lateral sealer lift means 7 comprises running pulleys 7A, 7B of a gear construction which is upwardly/downwardly rotatably mounted on a support plate 7T which is disposed at one side of the lateral sealer frame 6a, fixed pulleys 7C, 71) of a gear construction which is rotatably mounted on upper and lower machine body I located within a moving range of the lateral sealer frame 6a, a lateral sealer upper/lower driving motor 7M for drive rotating the fixed pulley 7C, and a link member 8 consisting of a timing belt, a chain or the like whose upper and lower opposite end portions 8a, 8b are, as illustrated, fixed to the tipper and lower machine body 1 side and whose intermediate portions are trained over the upper and lower running pulleys 7A, 7B and in that state, the timing belt, or the like is vertically inverted so as to be trained over the upper and lower fixed pulleys 7C, 7D.

According to the lateral sealer lift means 7 thus constructed, when the driving motor 7M causes the pulley 7C to be rotated in a counterclockwise direction in FIG. 3, the link member 8 consisting of a timing belt or chain or the like and the pulleys 7A through 7D are brought into engagement with each other to move the lateral sealer frame 6 downwardly. On the contrary, when the fixed gear 7C is rotated in a clockwise direction, the lateral sealer frame 6 can be moved upwardly. Accordingly, by appropriately controlling the number of rotations of the driving motor 7M, the quantity of upward and downward movement of the lateral sealer frame 6, namely the lateral sealers 6X, 6Y can be adjusted. Also, by appropriately controlling the number of rotations of the packing material feed driving motor AM, the packing material FX corresponding to that portion withdrawn by the lateral sealer device 6 is fed.

Reference numeral 9 generally denotes a cutter unit which is disposed on a lower side portion of the lateral sealer device 6. This cutter unit 9 comprises cutters 9A, 9B for vertically cutting a center line portion of the lateral seal S which sealing was carried out by the lateral sealer device 6, and a crankshaft 9R whose distal end portion is attached to the cutter 9A and whose basal end portion is attached to a disk 9K which can be rotated by a cutter driving motor 9M. An air-cylinder may be used, where necessary, as the driving means instead of the motor 9M.

Figure 2:
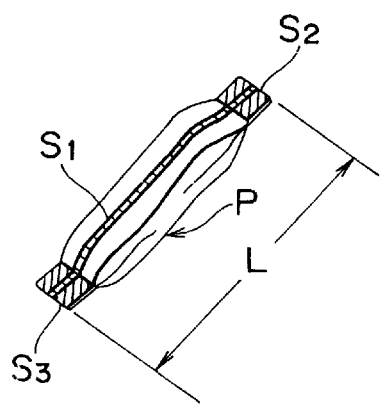
FIG. 2 is a perspective view of a seal-molded packing product according to the present invention.

FIG. 2 shows an outer appearance of a stick-like packing product P which was packed by a multiple automatic packing machine thus constructed. In the illustration, reference character $S_1$ denotes a vertical sealed portion; $S_2$ and $S_3$, upper and lower lateral sealed portions cut by the cutters 9A, 9B; and L, the length dimension (size) of the packing product P, respectively. According to the performance controller of the present invention, it becomes possible to seal-mold stick-like packing products P of various sizes which have different length dimensions L and different filling quantities.

In FIG. 1, reference numeral 16 denotes a keyboard disposed on the machine body 1. The keyboard 1 is provided with various keys such as data read/write keys for setting the size of each of the packing product P, a mode switching key, and data input keys. A display unit 15 disposed on the machine body 1 displays,.in operation, input program data, size numbers of the packing products, or various message numbers for operation.

Figure 5:
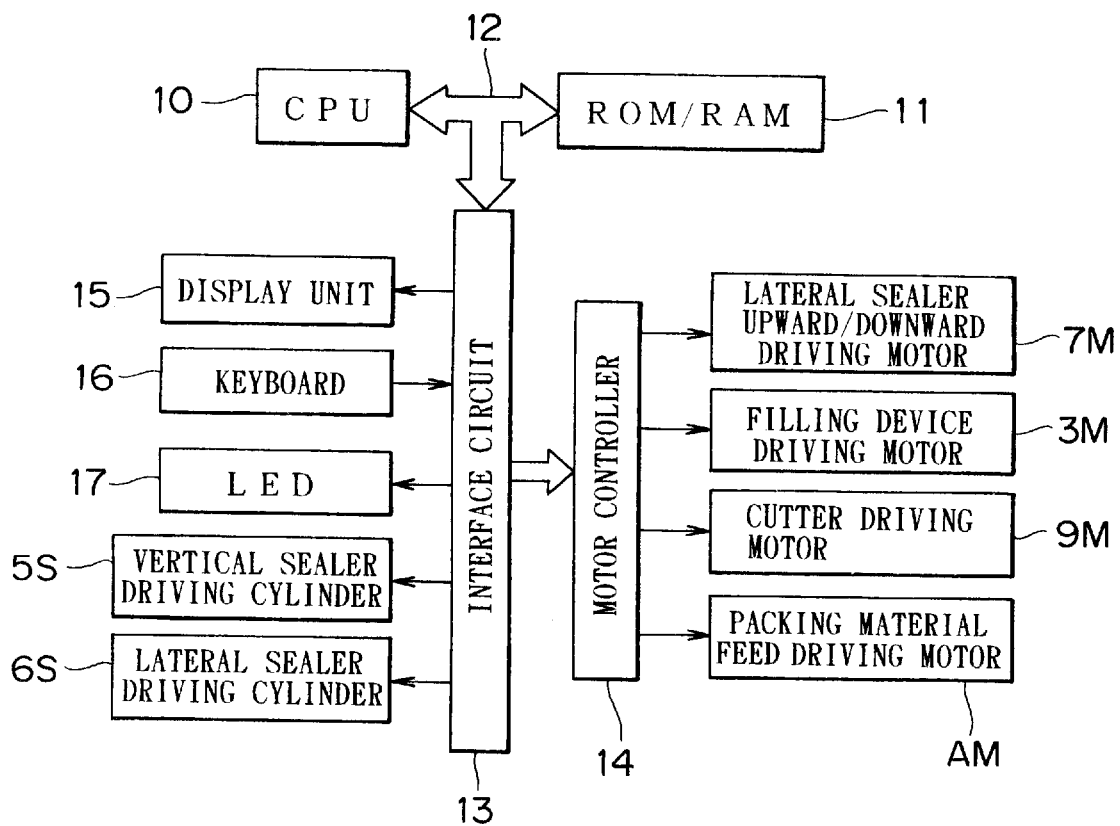
FIG. 5 is a block diagram for explaining an electrical construction of the present invention.

FIG. 5 shows one example of an electrical construction of a performance controller according to the present invention, in which a micro computer is installed. In the illustration, reference numeral 10 denotes a CPU constituting the center of a control unit; 11, a memory unit consisting of a ROM in which a system program is stored and a RAM for storing various kinds of input data; 13, an interface circuit connected to between the CPU 10 and the memory unit 11 through a bus 12; and 14, a motor controller connected to this interface circuit, respectively. This motor controller 14 is connected with the packing material feed driving motor AM, the filling device driving motor 3M, the lateral sealer upper/lower driving motor 7M (for example, servo motor), and the cutter driving motor 9M (for example, servo motor), respectively.

The interface circuit 13 is connected with the cylinders 5S, 6S for driving the vertical sealer 5A and the lateral sealer 6X, the display unit 15, the keyboard 16 and the LED 17, and they are controllably operated in accordance with the program, which is stored in the memory unit 11, tinder supervision of the CPU 10.

FIG. 6 is an illustration showing a construction of one example of a data memory which is set by inputting data into the memory unit 11 through the keyboard 16. Many data of the number of rotations of the various driving motors AM, 3M, 7M and 9M, which are preliminary input for each size number of each of the packing product P, are stored here. Owing to this arrangement, the performance of each of the driving motors AM through 9M is controlled in accordance with the size number which is selected from the data memory. Therefore, the packing products P having a constant size (length L) with a predetermined quantity of content material filled therein can be continuously molded in a multiple manner, while feeding a predetermined quantity of the packing material FX.

Figure 7:
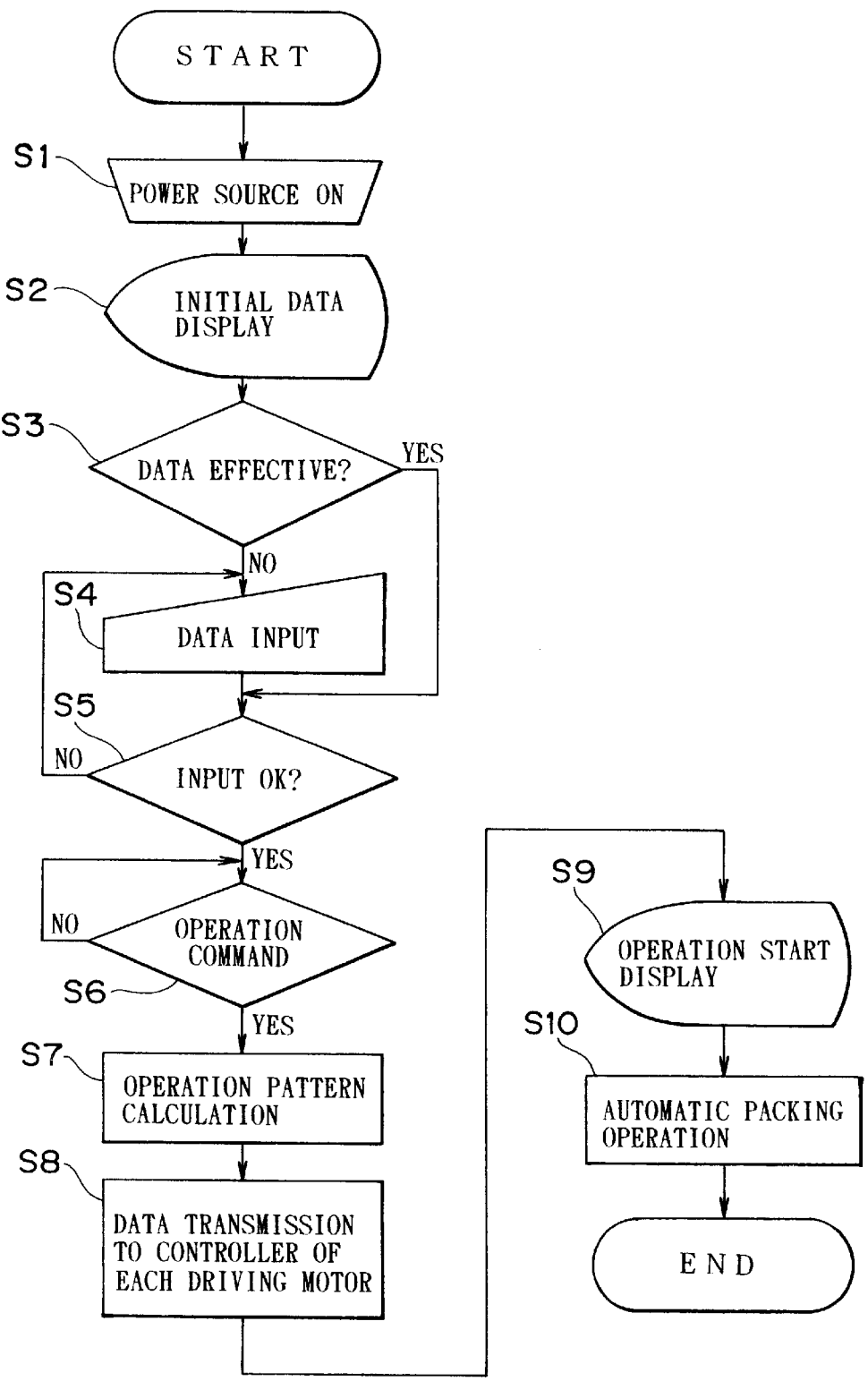
FIG. 7 is a flowchart for explaining the steps for seal-packing operation according to the present invention.

FIG. 7 is a flowchart for explaining the steps of procedures carried out by the performance controller of the present invention, which are executed in accordance with the program data stored in the memory unit 11. First, when a power switch (not shown) is turned on in Step SI, the process proceeds to the following Step S2 where the initial data, i.e., size number of the packing product P, is displayed in the display unit 15.

In the next Step S3, it is judged whether or not the displayed size number is effective. If the judgment result is "YES", the process proceeds to Step S5. In contrast, if the judgment result is "NO", the process proceeds to Step S4 where the data of desired size number are input through key operation. The process then proceeds to the next Step S5. In this Step S5, it is judged whether or not the data input of the size number is completed. If the judgment result is "YES", the process proceeds to the next step S6 where it is judged whether or not driving commands should be sent to the controller 14 for the driving motors AM through 9M. If it is judged that the driving commands should be sent, the process proceeds to the next Step S7. In contrast, if it is judged that the driving commands should not be sent, a standby posture is maintained until an affirmative judgment is made.

In the next Step S7, the CPU 10 calculates a driving pattern based on predetermined data. Then, in the next Step 8, the driving data calculated by the CPU 10 are transmitted to the controller 14 for the driving motors AM through 9M. In the following Step 9, an operation start message and a size number are displayed in the display unit 15. Then, the process proceeds to Step S10 where the multiple automatic packing machine is automatically driven in accordance with the calculated driving data.

As apparent from the above, according to a performance controller for a multiple automatic packing machine of the present invention, the length size of the stick-like packing products which are molded in a multiple manner and the timing for filling the content material can be simply and correctly changed by one-touch operation without exchanging the heat sealer and without a need of operation of a speed adjusting device and a rotation differential gear mechanism. Accordingly, the controller of the present invention is suited to be used for continuously heat sealing a predetermined number of stick-like packing products having different sizes and different kinds. Also, it exhibits such advantages that the frequency of wasteful test sealing required for changing the size and the filling timing can be reduced to the least possible level, thus enabling to prevent wasteful consumption of content material and packing film.

Moreover, according to the present invention, by programming such that the lateral seal frame is temporarily stopped in the uppermost position where the lateral seal is effected when a content material of fine powder is required to be packed, the problem of inferior sealing, which would otherwise occur due to entry of the fine powder material, which is whirled up when the material is being filled, into the lateral sealed-portion can effectively be solved. The controller of the present invention can exhibit its significant effect when it is applied to a multiple automatic packing machine for simultaneously molding a large number of stick-like packing products at a time.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

What is claimed is:

1. A multiple automatic packing machine for packing a material into bags, each of the having a length, the multiple automatic packing machine comprising:

slitting means, receiving a sheet-like packing material from a take-up roll, for slitting the sheet-like packing material into a predetermined number of packing films;

seal-molding means, receiving the packing films, for seal-molding each of said packing films into a bag-like configuration, said seal-molding means comprising a lateral sealer device for forming a lateral seal in each of the packing films, the lateral sealer device comprising a pair of lateral sealers and lateral sealer driving means for causing relative movement between the pair of lateral sealers to open and close the lateral sealer device;

filling means, receiving the packing films from the seal-molding means, for filling a portion of the material into each of said packing films;

withdrawing means for withdrawing each of said packing films by lowering said lateral sealer device from an initial position by a distance equal to the length of the bag to pull said each of said packing films, opening said lateral sealer device and raising said lowered lateral sealer device back to said initial position, the withdrawing means comprising:

a guide shaft disposed in the multiple automatic packing machine;

a lateral sealer frame having the pair of lateral sealers and the lateral sealer driving means mounted on the lateral sealer frame the lateral sealer frame being disposed on the guide shaft for movement up and down on the guide shaft;

a motor for supplying a motive power for moving the lateral sealer frame up and down;

a link member for conveying the motive power from the motor to the lateral sealer frame; and a plurality of pulleys on the lateral sealer frame, the link member being trained over the plurality of pulleys;

cutting means for cutting a center line portion of the lateral seal of each of said packing films; and a performance controller for said multiple automatic packing machine, said performance controller comprising:

key input means for receiving an input representing a desired value for the length of the bag;

program input means for setting a number of rotations of the motor and timings of operation of said filling means and said cutting means in accordance with the desired value for the length of the bag in accordance with the input received by the key input means and a program stored in the program input means; and control means for controlling the motor and the filling means and said cutting means in accordance with the number of rotations and the timings of operation set by the program input means.

2. A multiple automatic packing machine as defined in claim 1, wherein the link member comprises a chain.

3. A multiple automatic packing machine as defined in claim 1, wherein the seal-molding means further comprises a vertical sealer for forming a vertical seal in each of the packing films.

4. A multiple automatic packing machine as defined in claim 1, wherein the link member comprises a timing belt.

* * * * *